(12) United States Patent
Ogata

(10) Patent No.: US 6,930,976 B2
(45) Date of Patent: Aug. 16, 2005

(54) OPTICAL RECORDING MEDIUM AND OPTICAL PICKUP DEVICE

(75) Inventor: Nobuo Ogata, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 735 days.

(21) Appl. No.: 09/784,061

(22) Filed: Feb. 16, 2001

(65) Prior Publication Data

US 2001/0015950 A1 Aug. 23, 2001

(30) Foreign Application Priority Data

Feb. 17, 2000 (JP) .......................................... 2000-039166
Jan. 24, 2001 (JP) .......................................... 2001-015155

(51) Int. Cl.⁷ .................................................. G11B 7/24
(52) U.S. Cl. .................................... 369/275.3; 369/121
(58) Field of Search ........................ 369/109.01, 275.4, 369/120, 116, 275.3, 275.1, 112.17, 44.26, 44.13, 121

(56) References Cited

U.S. PATENT DOCUMENTS

| | | | |
|---|---|---|---|
| 4,812,638 A | 3/1989 | Ogata et al. | |
| 4,849,825 A | 7/1989 | Kurata et al. | |
| 5,391,865 A | 2/1995 | Kurata et al. | |
| 5,414,652 A | * 5/1995 | Mieda et al. | ................. 365/122 |
| 5,442,616 A | 8/1995 | Ogata et al. | |
| 5,581,539 A | * 12/1996 | Horie et al. | ............. 369/275.4 |
| 5,745,475 A | * 4/1998 | Ohno et al. | ............. 369/275.4 |
| 5,940,364 A | * 8/1999 | Ogata et al. | ............. 369/275.4 |
| 6,040,030 A | * 3/2000 | Utsunomiya et al. | ...... 428/64.1 |
| 6,388,984 B2 | * 5/2002 | Kitaura et al. | ........... 369/275.4 |
| 6,407,979 B1 | * 6/2002 | Matsumoto et al. | ...... 369/275.4 |

FOREIGN PATENT DOCUMENTS

| | | |
|---|---|---|
| JP | 11110829 | 4/1999 |
| JP | 11120621 | 4/1999 |

* cited by examiner

*Primary Examiner*—Paul W. Huber
(74) *Attorney, Agent, or Firm*—Birch, Stewart, Kolasch & Birch, LLP

(57) ABSTRACT

An optical recording medium is arranged such that respective information recorded on lands and grooves are reproducible by either of a light beam of a first wavelength λ1 and a light beam of a second wavelength λ2 which is shorter than the first wavelength λ1. The groove depth d of the optical recording medium is such that tracking error signals of not less than a predetermined level can be ensured for respective wavelengths λ1 and λ2 without generating distortion in waveform, irrespectively of differences in receiving light sensitivity of a photodetector provided in a optical pickup devices for use in recording and reproducing information on and from such optical recording medium.

28 Claims, 10 Drawing Sheets

F I G. 2
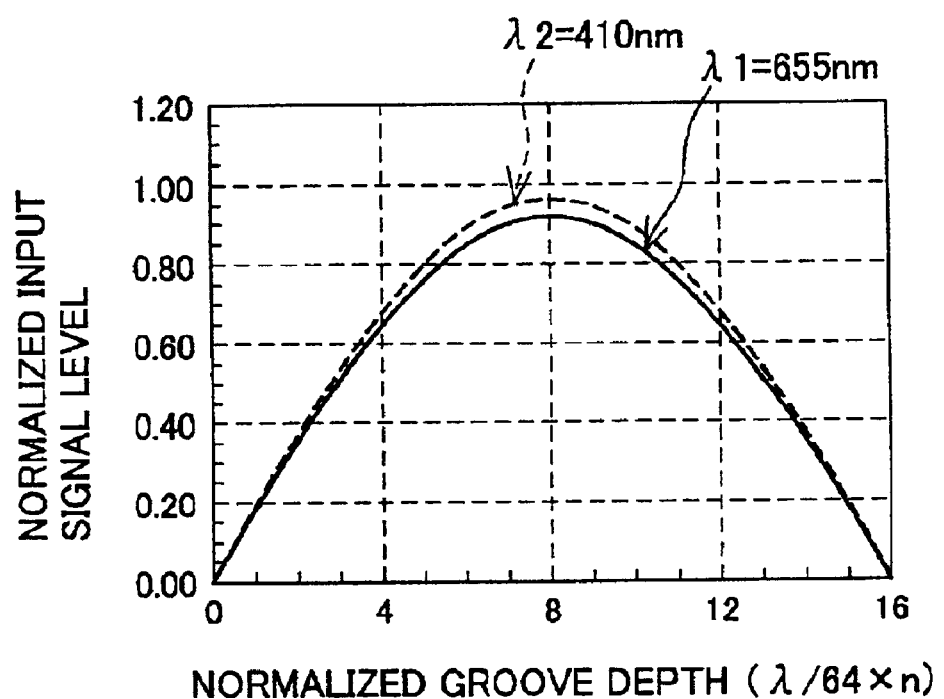

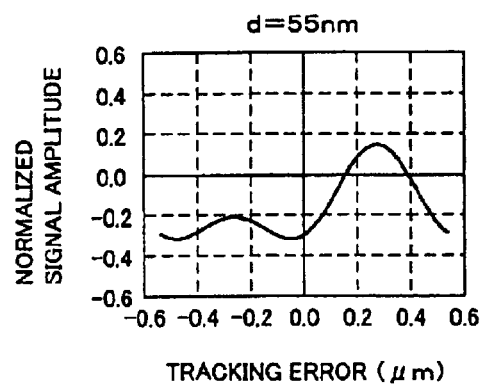
F I G. 5 (a)
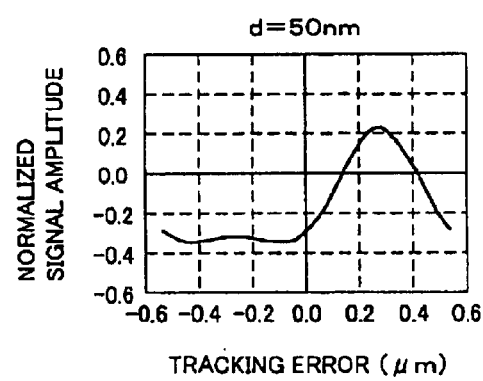
F I G. 5 (b)
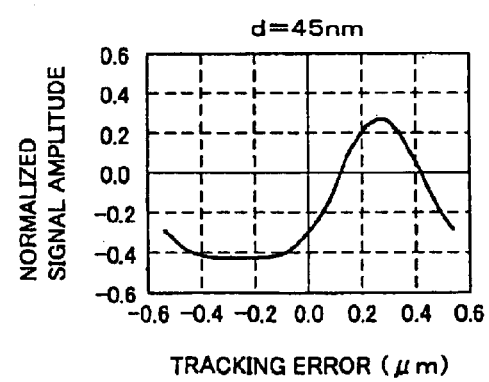
F I G. 5 (c)
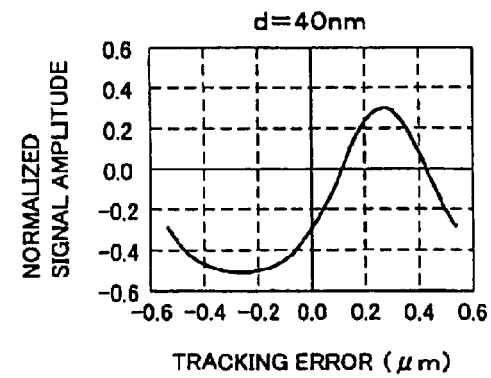
F I G. 5 (d)

F I G. 8
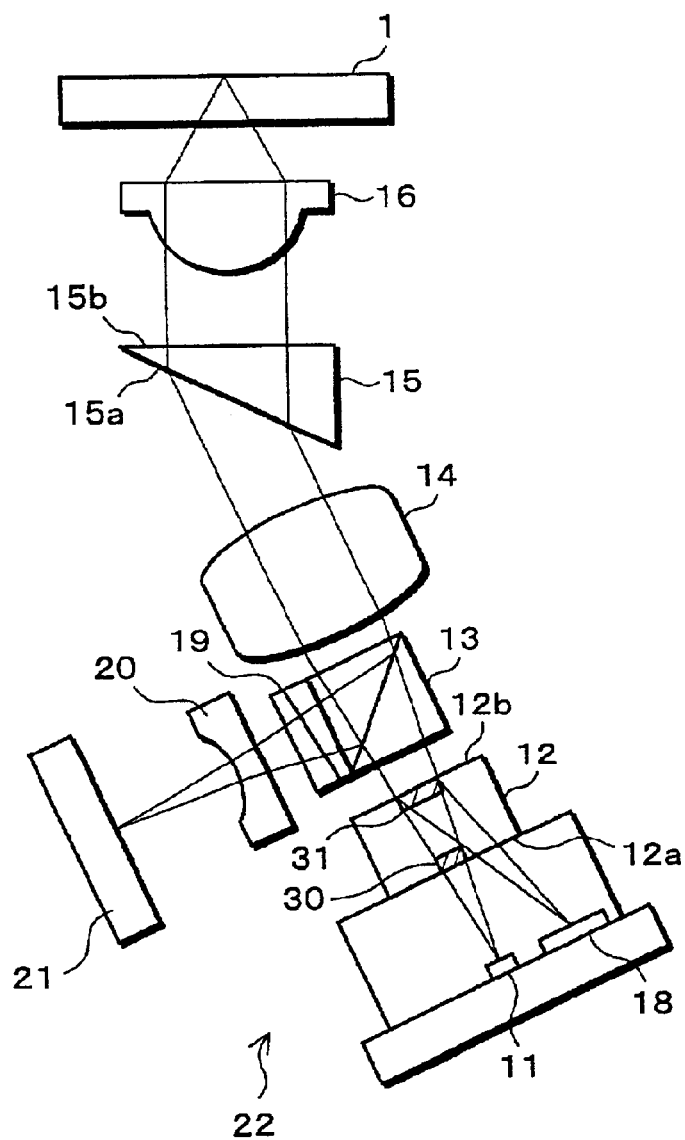

P-POLARIZATION

OPTICAL RECORDING MEDIUM AND OPTICAL PICKUP DEVICE

FIELD OF THE INVENTION

The present invention generally relates to an optical recording medium such as a phase change medium or a magneto-optical medium for recording and reproducing, and particularly relates to an optical recording medium which is at least reproducible by either of light beams having two different wavelengths. The present invention also relates to an optical pickup device for recording and reproducing information on and from such optical recording medium which is at least reproducible by either of light beams having two different wavelengths.

BACKGROUND OF THE INVENTION

With an increasing demand for multimedia, large volume data such as digital still picture or dynamic picture are more and more dealt with. Such large volume data are usually stored in recording medium of large storage capacity, and the data as stored therein are randomly accessed to be reproduced as necessary. For such recording media, optical disks have been used for their superior characteristics as to random access approach, and high density recording over magnetic recording media like floppy disks, etc.

Among the foregoing optical disks, particularly for those capable of recording and reproducing information, magneto-optical media and phase change media are generally used in practical applications. A magneto-optical recording medium is structured such that a recording layer made of a ferromagnetic film of perpendicular magnetization is formed on a substrate. For such magneto-optical recording medium, recording of information is performed by focusing a light beam on the recording layer from an optical head while applying thereto a magnetic field from a magnetic head, so as to form magnetic domains corresponding to information to be recorded on the recording layer. On the other hand, reproducing of information is performed from the magneto-optical recording medium by detecting a change in Kerr rotation angle that varies depending on a direction of a magnetic domain formed in the recording layer.

On the other hand, for the phase change medium, recording of information is performed by focusing a light beam on the recording layer, and selectively forming a crystalline portion and an amorphous portion using the resulting heat from a light beam spot. On the other hand, reproduction of information from the phase change medium is performed based on a difference in amount of reflected light between the crystalline portion and the amorphous portion.

For both of the foregoing magneto-optical medium and phase change medium, when recording and reproducing, a light beam spot is subjected to a tracking control so as to follow exactly a track using protrusions and recessions called lands or grooves formed on the surface of the substrate as a tracking guide. In order to realize the optical disk of still larger storage capacity, the land and groove recording system wherein information are recorded on both lands and grooves has been adopted in many practical applications. For this land and groove recording system, the lands and the grooves are formed in virtually the same width.

In order to make a light beam spot exactly follow a track, a phenomenon in which a diffraction pattern of reflected light from an optical disk varies depending on the relative position between a light beam and a track is utilized. Known methods of utilizing the foregoing phenomenon include: a push-pull method for generating a tracking error signal from one beam, or three beam method for generating a tracking error signal from three beams, and a differential push-pull (DPP) method.

Here, a beam spot diameter is proportional to the wavelength of the light beam. Therefore, a smaller beam spot diameter can be obtained by reducing the wavelength of the light beam emitted from a light source. Specifically, developments have been made to use a blue color semiconductor later beam having a wavelength within a range of from 390 nm to 430 nm in practical applications. As described, attempts have been made to realize optical disks of still higher recording density by reducing the wavelength of a light beam emitted from the light source.

For optical disks adopting magneto-optical recording media, an optical disk for recording thereon and reproducing therefrom information by projecting a light beam having a wavelength of 655 nm through an objective lens having a numerical aperture of 0.65 to be focused thereon to form a beam spot having a diameter of around 0.9 $\mu$m has been developed. This optical disk includes a substrate having a thickness within a range of from 0.5 mm to 0.6 mm whereon lands and grooves are formed as recording tracks with a track pitch (groove width) of 0.535 $\mu$m. Hereinafter, this optical disk is referred to as a low density optical disk. In this low density recording optical disk, the groove depth is set so as to ensure an amplitude of a tracking error signal of not less than a predetermined level.

On the other hand, an optical disk which permits recording and reproducing at still higher density using a light beam having a shorter wavelength has been developed. This optical disk, for example, includes a substrate having a thickness within a range of from 0.5 mm to 0.6 mm whereon lands and grooves are formed as recording tracks with a track pitch (groove width) of 0.33 $\mu$m. For example, the optical disk for recording thereon and reproducing therefrom information by projecting a light beam having a wavelength of 410 nm through an objective lens having a numerical aperture of 0.65 to be focused thereon to form a beam spot having a diameter of around 0.5 $\mu$m has been proposed. Hereinafter, this optical disk is referred to as a high density optical disk. In this high density recording optical disk, the groove depth is set so as to ensure an amplitude of a tracking error signal of not less than a predetermined level.

For optical pickup devices adopting a light source for emitting a light beam of a short wavelength, development of those which permit recording and reproduction of information with respect to not only high density optical disks but also low density optical disks is desired, and particularly the development of those which permits at least reproduction of information from the low density optical disks is desired for sake of user's convenience. However, a difference in wavelength of light beams adopted causes a difference in optimum groove depth between the high density optical disk and the low density optical disk, and therefore it is expected to be difficult to perform desirable tracking servo for both high density optical disks and low density optical disks.

For a photodetector of the optical pickup device, an SiPIN photodiode is generally used However, the SiPIN photodiode is known to have such characteristic that a receiving light sensitivity varies depending on a wavelength of an incident light (the receiving light sensitivity corresponds to the efficiency for converting the light incident on the light receiving face into current).

For example, the SiPIN photodiode S6795 available from Hamamatsu Photonics Co., Ltd., according to the spectral sensitivity described in its explanation, has a peak receiving light sensitivity for a wavelength of 800 nm, and shows a significantly lower receiving light sensitivity for a blue beam in a wavelength band of 400 nm. The SiPIN shows receiving light sensitivities of 0.48 A/W, 0.22 A/W, and 0.2 A/W for the wavelengths of 655 nm, 410 nm, and 400 nm respectively. Therefore, assumed the receiving light sensitivity for the wavelength of 655 nm be 100 percent, then, the respective receiving light sensitivities for the wavelengths of 410 nm and 400 nm would be only 46 percent and 42 percent respectively.

In view of the forgoing, recently developments have been made to realize an SiPIN photodiode which offers an improved receiving light sensitivity in a short wavelength band. For example, S5973-02 available from Hamamatsu Photonics Co., Ltd., according to the spectral sensitivity described in its explanation, shows a peak receiving light sensitivity for a wavelength of 760 nm, and receiving light sensitivities of 0.44 A/W, 0.32 A/W, and 0.30 A/W for the wavelengths of 655 nm, 410 nm, and 400 nm respectively. Therefore, assumed the sensitivity for the wavelength of 655 nm be 100 percent, then, the respective sensitivities for the wavelengths of 410 nm and 400 nm would be 73 percent and 68 percent respectively.

However, even with the foregoing SiPIN photodiode which offers an improved receiving light sensitivity in the short wavelength band, due to variations in receiving light sensitivity with changes in wavelength of the incident light beam, it is still likely that its receiving light sensitivity drops particularly for the wavelength band of 400 nm. Therefore, even when adopting an optical recording medium which offers signals in the same light amount for the two different wavelengths, the output level of the signal from the photodetector drops, which in turn reduces the SN ratio of the tracking error signal, resulting in insufficient tracking servo.

Moreover, for the optical recording medium from which information are reproducible using light beams of two different wavelengths, the light beam of a shorter wavelength shows greater variations in signal level with changes in groove depth. Therefore, in the case of setting the groove depth so as to ensure a signal of a predetermined level for both of the light beams of two different wavelengths, a drop in signal level with changes in groove depth due to variations in the manufacturing processes becomes more obvious for the light beam of a shorter wavelength.

Furthermore, in the case of reproducing information from the low density optical disk using an optical pickup device for high density optical disk, provided with a light source for emitting a light beam having a short wavelength, another problem arises. That is, since a ratio of a spot diameter to a track pitch becomes too small, an area in which three beams of 0th order diffracted light beam and ± first order diffracted light beams interfere each other is formed at a central portion of a diffraction pattern of a light beam reflected from the optical recording medium due to guide tracks formed thereon. As a result, the waveform of a tracking error signal is distorted, and an error in counting tracks is liable to occur.

SUMMARY OF THE INVENTION

The present invention is achieved in finding a solution to the foregoing problems, and it is therefore an object of the present invention to realize an optical recording medium which ensures a tracking error signal of a predetermined level irrespectively of differences in receiving light sensitivity of photodetectors due to differences in wavelength of light beams by forming grooves in depth of a specific range.

It is another object of the present invention to realize an optical recording medium which permits a reduction in signal level caused by an error in groove depth due to variations in manufacturing processes to be more effectively suppressed when adopting a light beam of a shorter wavelength.

It is yet another object of the present invention to realize an optical recording medium which is free from a distortion in waveform of a tracking error signal even in the case of having a wide track pitch with respect to a beam spot diameter focused on the optical recording medium by forming grooves in depth of a specific range.

In order to achieve the foregoing object, an optical recording medium of the present invention is characterized by comprising:

lands and grooves, the optical recording medium at least being reproducible by either of i) a first optical pickup device provided with a light source for emitting a light beam having a first wavelength $\lambda 1$, and a photodetector having a receiving light sensitivity s1 with respect to the first wavelength $\lambda 1$, and ii) a second optical pickup device provided with a light source for emitting a light beam having a second wavelength $\lambda 2$ which is shorter than the first wavelength $\lambda 1$, and a photodetector having a receiving light sensitivity s2 with respect to the second wavelength $\lambda 2$, which is lower than receiving light sensitivity s1, where n the grooves are formed in such depth that both of a signal outputted from the photodetector of the first optical pickup device and a signal outputted from the photodetector of the second optical pickup device have not less than a predetermined level.

In order to achieve the foregoing object, another optical recording medium of the present invention is characterized by comprising:

lands and grooves, the optical recording medium at least being reproducible by either of i) a light beam having a first wavelength $\lambda 1$, and ii) a light beam having a second wavelength $\lambda 2$ which is shorter than the first wavelength $\lambda 1$, wherein the groove depth d satisfies the conditions of:

$$\lambda 1/n1 \times (3/64) \leq d \leq \lambda 1/n1 \times (13/64); \text{ and}$$

$$\lambda 2/n2 \times (4/64) \leq d \leq \lambda 2/n2 \times (12/64),$$

wherein n1 and n2 indicate refractive indexes of the optical recording medium for the first wavelength $\lambda 1$ and the second wavelength $\lambda 2$ respectively.

In order to achieve the foregoing object, still another optical recording medium of the present invention is characterized by including lands and grooves, the optical recording medium at least being reproducible by either of i) a light beam having a first wavelength $\lambda 1$, and ii) a light beam having a second wavelength $\lambda 2$ which is shorter than the first wavelength $\lambda 1$, wherein the grooves are formed in width within a range of from 0.5 $\mu$m to 0.6 $\mu$m, and in depth d within a range of from 19.4 nm to 47.5 nm.

In order to achieve the foregoing object, yet still another optical recording medium of the present invention is characterized by including lands and grooves, the optical recording medium at least being reproducible by either of i) a light beam having a first wavelength $\lambda 1$, and ii) a light beam having a second wavelength $\lambda 2$ which is shorter than the first wavelength $\lambda 1$, wherein the groove depth d satisfies the condition of:

$$\lambda 1/n1 \times (3/64) \leq d \leq \lambda 1/n1 \times (13/64),$$

wherein n1 indicates a refractive index of the optical recording medium for the first wavelength λ1, and a reflective index r1 of the optical recording medium with respect to the first wavelength λ1 is smaller than a reflective index r2 with respect to the second wavelength λ2.

In order to achieve the foregoing object, yet still another optical recording medium of the present invention is characterized by including lands and grooves, the optical recording medium at least being reproducible by either of i) a light beam having a first wavelength λ1, and ii) a light beam having a second wavelength λ2 which is shorter than the first wavelength λ1, wherein the groove depth d satisfies the condition of:

$$\lambda 1/n1 \times (3/64) \leq d \leq \lambda 1/n1 \times (13/64),$$

wherein n1 indicates a refractive index of the optical recording medium for the first wavelength λ1, and a reproducing power p1 of the optical recording medium set for the first wavelength λ1 is lower than a reproducing power p2 set for the second wavelength λ2.

In order to achieve the foregoing object, yet still another optical recording medium of the present invention is characterized by including lands and grooves, the optical recording medium at least being reproducible by either of i) a light beam having a first wavelength λ1, and ii) a second beam having a second wavelength λ2 which is shorter than the first wavelength λ1, wherein the groove depth d satisfies the condition of:

$$\lambda 1/n1 \times (3/64) \leq d \leq \lambda 1/n1 \times (13/64),$$

wherein n1 indicates a refractive index of the optical recording medium for the first wavelength λ1, and a reflective index r1 of the optical recording medium with respect to the first wavelength λ1 and a reflective index r2 with respect to the second wavelength λ2 satisfy the condition of:

$$r2 \times p2 > r1 \times p,$$

wherein p1 is a reproducing power of the optical recording medium set for the first wavelength λ1 and p2 is a reproducing power set for the second wavelength λ2.

In order to achieve the foregoing object, an optical pickup device of the present invention for recording and reproducing information with respect to the optical recording medium of the foregoing structure is characterized by including:

a light source for emitting the light beam having the second wavelength λ2, and a photodetector for receiving light reflected from the optical recording medium, wherein the photodetector has a receiving light sensitivity s2 with respect to the second wavelength λ2 satisfying the condition of:

$$s2/s1 \geq 0.73,$$

wherein s1 is a receiving light sensitivity of the photodetector with respect to the first wavelength λ1.

In order to achieve the foregoing object, another optical pickup device of the present invention for recording and reproducing information with respect to the optical recording medium of the foregoing structure is characterized by including:

a light source for emitting the light beam having the second wavelength λ2, and a photodetector for receiving light reflected from the optical recording medium, wherein the photodetector has a receiving light sensitivity s2 with respect to the second wavelength λ2 satisfying the condition of:

$$s2/s2 \geq 0.57,$$

wherein s1 is a receiving light sensitivity of the photodetector with respect to the first wavelength λ1.

For a fuller understanding of the nature and advantages of the invention, reference should be made to the ensuing detailed description taken in conjunction with the accompanying drawings.

BRIEF DESCRIPTION OF THE DRAWINGS

FIG. 2 is a graph showing respective relationships between normalized groove depths and normalized light amounts of tracking error signals when projecting light beams having wavelengths of 655 nm and 410 nm onto the optical disk of the present invention.

FIG. 5(a) through FIG. 5(d) are graphs which explain variations in waveform of a tracking error signal with respect to variations in groove depth when projecting a light beam having a wavelength of 410 nm onto the optical disk of the present invention.

FIG. 8 is an explanatory view illustrating the structure of an optical pickup device in accordance with one embodiment of the present invention.

DESCRIPTION OF THE EMBODIMENTS

[First Embodiment]

Figure 1:
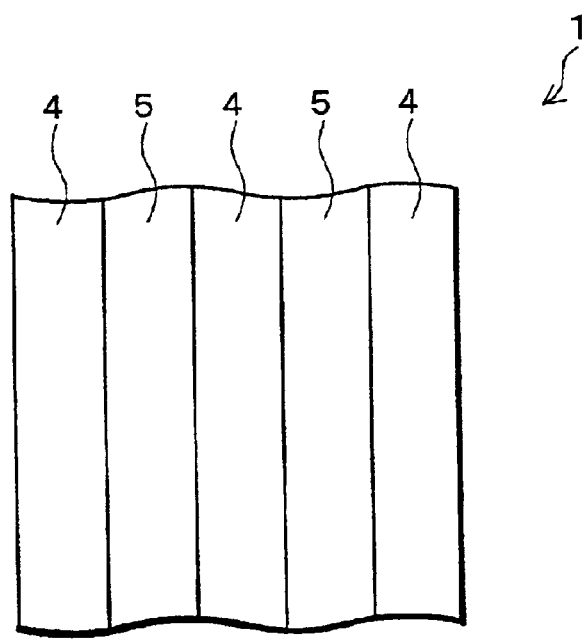
FIG. 1(a) and FIG. 1(b) are explanatory views schematically illustrating the structure of an optical disk in accordance with one embodiment of the present invention.
Figure 1:
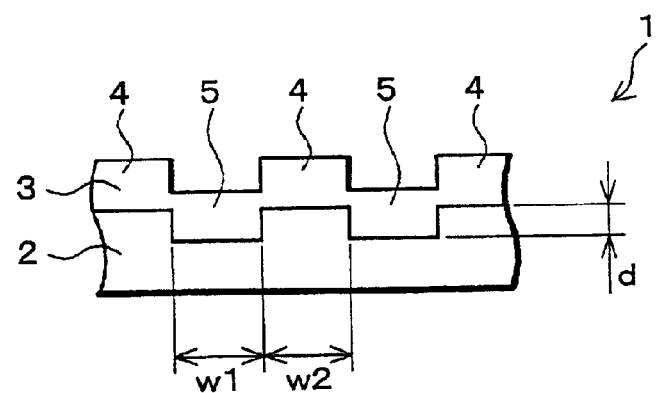

The following descriptions will discuss one embodiment of the present invention with reference to FIGS. 1(a) and 1(b) through FIGS. 7(a) to 7(d). In the present embodiment, explanations will be given through the case of adopting an optical disk (disk-shaped recording medium) as an example of the optical recording medium of the present invention. However, the optical recording medium of the present invention is not necessarily limited to the disk-shaped recording medium, and, for example, a card-shaped recording medium or a sheet-shaped recording medium may be adopted as well.

For the light beams of two different wavelengths for use in recording and reproducing information on and from the optical disk (optical recording medium), a light beam having a wavelength $\lambda 1=655$ nm and a light beam having a wavelength $\lambda 2=410$ nm are adopted. Again, the wavelengths of the present invention are not necessarily limited to the above combination, and various other combinations of wavelengths are applicable with a selection among i) an infrared semiconductor laser for a wavelength within a range of from 780 nm to 830 nm, ii) a red semiconductor laser for a wavelength within a range of from 630 nm to 680 nm, and iii) a blue semiconductor laser for a wavelength within a range of from 390 nm to 430 nm as light source. Also for the number of the light beams, the present invention is not intended to be limited to two, and more than two light beams may be adopted.

FIG. 1(a) and FIG. 1(b) are enlarged views of an optical disk 1 of the present embodiment. The optical disk 1 includes a recording layer 3 formed on a transparent substrate 2. The substrate 2 is made of resin such as polycarbonate, polyolefine (trade name: "ARTON"), or the like. The thickness of the substrate 2 is set within a range of from 0.5 mm to 0.6 mm, and a disk diameter is set within a range of from 120 mm to 50 mm.

On the substrate 2, lands 4 and grooves 5 are formed alternately in a radial direction. To be suited for the land and groove recording system for recording and reproducing with respect to both the lands 4 and the grooves 5, the ratio of the width w1 of the lands 4 to the width w2 of the grooves 5 is set to virtually 1 to 1. In the present embodiment, both the land width w1 and the groove width w2 are set to 0.535 μm (w1=w2=0.535 μm). The optical disk 1 of the present embodiment has a track pitch (an interval between the center of a land and the center of the groove adjacent to the land) of 0.535 μm. In FIG. 1(b), d indicates a groove depth.

To enable the land and groove recording to be performed under stable condition, a reproducing layer (not shown) is formed between the substrate 2 and the recording layer 3. This reproducing layer functions such that in a part of an area irradiated with a light beam which is not heated to above a predetermined temperature, the in-plane magnetization is maintained, and the magnetization recorded in the recording layer is masked, while in a part of an area irradiated with a laser beam which is heated to above the predetermined temperature, the magnetization shifts from the in-plane magnetization to the perpendicular magnetization, and the magnetization of the recording layer is copied thereto. This reproducing layer enables a signal to be reproduced at higher resolution than an optical resolution determined by a beam spot diameter. The medium provided with the reproducing layer of the foregoing function is generally called "super-resolution magnetic medium". In the case of the super-resolution magnetic medium, a crosstalk from the adjoining tracks can be suppressed by the masking effect of the reproducing layer. It is therefore possible to perform the land and groove recording on the super-resolution magnetic medium.

On the other hand, for an optical recording medium on which the land and groove recording cannot be performed due to a large amount of leakage from adjacent tracks, the groove recording system is adopted wherein only the grooves are used, without using adjacent lands for recording and reproducing. In this case, the track pitch indicates an interval between centers of adjacent grooves.

For the recording medium of the groove recording system, when recording thereon and reproducing therefrom information by projecting a light beam having a wavelength of 655 nm through an objective lens having a numerical aperture of 0.65 to be focused on the recording medium to form a beam spot having a diameter of around 0.9 μm, the respective limits for the groove depth, the land width and the track pitch would be around 0.50 μm, 0.24 μm, and 0.74 μm respectively.

FIG. 2 shows levels (amounts of light incident on a photodetector) of a tracking error signal (push-pull signal) obtained as a result of experiment performed with respect to the optical disk 1 illustrated in FIG. 1(a) and FIG. 1(b) with variable groove depth d. In this graph, the horizontal axis indicates a groove depth d, which is normalized using a wavelength $\lambda$ of a light beam and a refractive index n of the substrate 2 for the wavelength $\lambda$. A unit scale in this graph corresponds to 1/64 of $\lambda/n$. The numerical aperture of the objective lens for focusing the light beam is set to 0.65. The vertical axis in this graph indicates a signal level of a tracking error signal, which is normalized using a reflected light from a mirror section (not shown) of the optical disk 1.

In the graph of FIG. 2, the solid line indicates levels of the tracking error signal when adopting a light beam having a wavelength $\lambda 1=655$ nm, and the dotted line indicates levels of the tracking error signal when adopting a light beam having a wavelength $\lambda 2=410$ nm. As can be seen from the results shown in the graphs the respective tracking error signals (push-pull signal) show maximum levels with a groove depth $d=\lambda/n\times(8/64)$, i.e., $d=\lambda/n\times(1/8)$. The maximum level of the tracking error signal when adopting the wavelength $\lambda 1$ differs from the maximum level of the tracking error signal when adopting the wavelength $\lambda 2$ due to a difference in ratio of the beam diameter to the track pitch between these two cases, which in turn causes a difference in diffraction efficiency.

For the tracking error signal, it can be assumed that a level any higher than 0.5 to 0.55 times of the maximum level at the wavelength $\lambda 1=655$ nm would be sufficient to ensure the precision in tracking servo. Therefore, from the results shown in the graph of FIG. 2, by setting the groove depth d so as to satisfy the conditions of:

$$\lambda 1/n1\times(3/64) \leq d \leq \lambda 1/n1\times(13/64); \text{ and}$$

$$\lambda 2/2n\times(3/64) \leq d \leq \lambda 2/n2\times(13/64),$$

the precision in tracking servo can be ensured for both of the light beams of two different wavelengths, i.e., the wavelength $\lambda 1$ and the wavelength $\lambda 2$.

FIG. 3(a) and FIG. 3(b) are graphs which explain levels (current output from the photodetector) of the tracking error signal (push-pull signal) obtained as a result of experiment performed with respect to the optical disk 1 illustrated in FIG. 1(a) and FIG. 1(b) with variable groove depth d. In these graphs, the horizontal axis indicates a groove depth d which is normalized in the same manner as the aforementioned case of FIG. 2, and the vertical axis indicates a level of a tracking error signal, which is normalized by a maximum signal level when adopting wavelength $\lambda 1=655$ nm. For the tracking error signal, it can be assumed that a level any higher than 0.5 to 0.55 times of the maximum signal level at a wavelength $\lambda 1=655$ nm would sufficient to ensure the precision in tracking servo.

Figure 3:
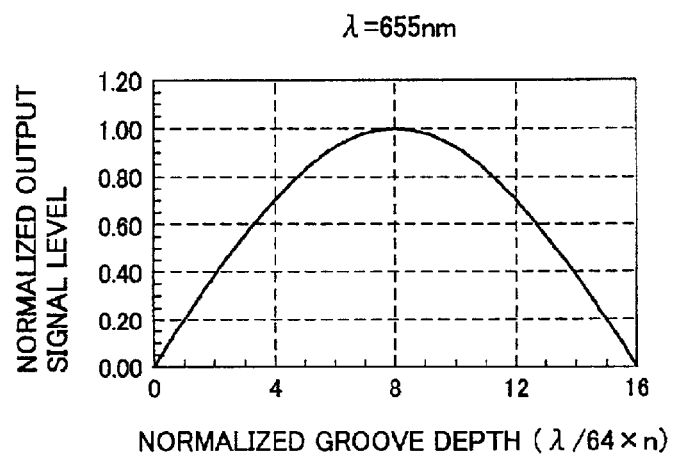
FIG. 3(a) and FIG. 3(b) are graphs showing relationships between normalized groove depths and normalized tracking error signals output from a photodetector when projecting light beams having wavelengths of 655 nm and 410 nm onto the optical disk of the present invention.
Figure 3:
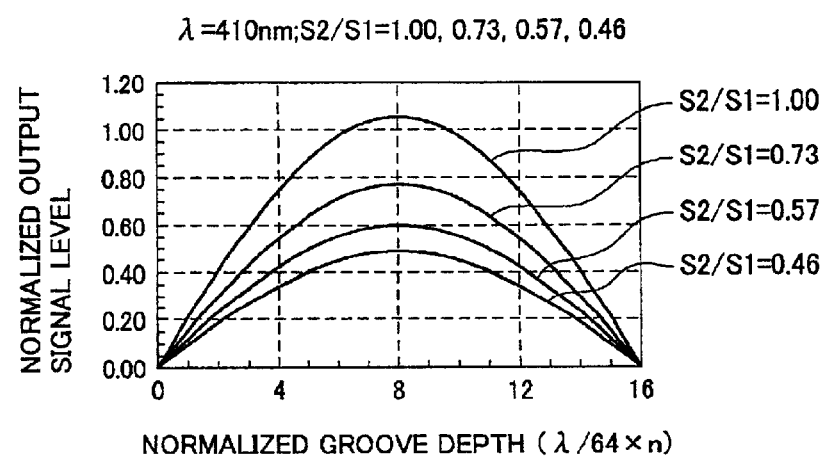

FIG. 3 (a) show levels of the tracking error signal at wavelength λ1=655 nm. Assumed the refractive index of the substrate 2 at the wavelength λ1 be n1, then the depth d of the grooves within the range of λ1/n1×(3/64)≦d≦λ1/n1×(13/64) would provide a tracking error signal of a sufficient level to ensure the precision in tracking servo.

FIG. 3(b) show levels of the tracking error signal at a wavelength λ2=410 nm. The receiving light sensitivity of the photodetector has a dependency on the wavelength, and in practice, the ratio of the receiving light sensitivity of s2/s1 of 1.00 would not be obtained (s1 is a receiving light sensitivity for the wavelength λ1=655 nm, and s2 is a receiving light sensitivity for the wavelength λ2=410 nm). For example, in the case of adopting S5973-02 available from Hamamatsu Photonics Co., Ltd. as the photodetector, the receiving light sensitivity of s2=0.32 A/W is obtained for s1=0.44 A/W, i.e., s2/s1=0.73. In consideration of possible variations in the receiving light sensitivity s2 of the photodetector, a lower receiving light sensitivity s2 of 0.25 A/W is possible, i.e., the ratio of s2/s1=0.57. Furthermore, when adopting S6795 available from Hamamatsu Photonics Co., Ltd. as an example of a normal photodetector with no improvement in receiving light sensitivity for the short wavelength, a still lower receiving light sensitivity of s2=0.22 A/w is obtained for s1=0.48 A/W, i.e., s2/s1=0.46. The graph in FIG. 3(b) shows the relationship between the output signal levels and the groove depths under four different conditions with variable receiving light sensitivity ratio (s2/s1=1.00, 0.73, 0.57 and 0.46).

With the receiving light sensitivity ratio of s2/s1=1.00, by forming the grooves in depth d so as to satisfy the condition of:

$$\lambda 2/n2 \times (3/64) \leq d \leq \lambda 2/n2 \times (13/64)$$

(n2 is a refractive index of the substrate 2 at the wavelength λ2), a tracking error signal of a sufficient level to ensure the precision in tracking servo can be ensured.

With the receiving light sensitivity ratio of s2/s1=0.73, by forming the grooves in depth d so as to satisfy the condition of:

$$\lambda 2/n2 \times (4/64) \leq d \leq \lambda 2/n2 \times (12/64)$$

a tracking error signal of a sufficient level to ensure the precision in tracking servo can be ensured.

With the receiving light sensitivity ratio of s2/s1=0.57, by forming the grooves in depth d so as to satisfy the condition of:

$$\lambda 2/n2 \times (6/64) \leq d \leq \lambda 2/n2 \times (10/64)$$

a tracking error signal of a sufficient level to ensure the precision in tracking servo can be ensured.

With the receiving light sensitivity ratio of s2/s1=0.46, there is no groove depth d which provides a tracking error signal of a sufficient level to ensure the precision in tracking servo. Therefore, with the above receiving light sensitivity ratio, without adopting the method to be described later, a tracking error signal of a sufficient level cannot be obtained from the optical disk 1 illustrated in FIGS. 1(a) and 1(b) using a light beam of a short wavelength.

From the above results, it can be seen that when adopting the photodetector having a receiving light sensitivity ratio of s2/s1≧0.73, by forming the grooves in depth d so as to satisfy the conditions of:

$$\lambda 1/n1 \times (3/64) \leq d \leq \lambda 1/n1 \times (13/64), \text{ and}$$

$$\lambda 2/n2 \times (4/64) \leq d \leq \lambda 2/n2 \times (12/64).$$

a tracking error signal of a sufficient level can be obtained from the optical disk 1 by either of the light beam of a long wavelength and the light beam of a short wavelength, thereby permitting recording on and reproducing from the optical disk 1.

When adopting the photodetector having a receiving light sensitivity ratio of s2/s1≧0.57, by forming the grooves in depth d so as to satisfy the conditions of:

$$\lambda 1/n1 \times (3/64) \leq d \leq \lambda 1/n1 \times (13/64), \text{ and}$$

$$\lambda 2/n2 \times (6/64) \leq d \leq \lambda 2/n2 \times (10/64).$$

a tracking error signal of a sufficient level can be obtained from the optical disk 1 by either of the light beam of a long wavelength and the light beam of a short wavelength, thereby permitting recording on and reproducing from the optical disk 1.

In the above experiments, the light beam having the wavelength 655 nm was adopted for the long wavelength, and the light beam having the wavelength 410 nm was adopted for the short wavelength. However, as long as the long wavelength is set within a range of from 630 nm to 680 nm, and a short wavelength is set within a range of from 390 nm to 430 nm, the recording and reproaching can be performed by either of the light beam of a long wavelength and the light beam of a short wavelength with a sufficient level of a tracking error signal by forming the groove in depth d so as to satisfy the above conditions.

In the above experiments, the grooves and lands in width of 0.535 μm were adopted; however, as long as the widths of the grooves and the lands are set within a range of from 0.5 μm to 0.6 μm, the same effects can be expected. When adopting the grooves and the lands any narrower than 0.5 μm, however, the output level of a tracking error signal at the long wavelength would be lowered, and it is therefore not possible to ensure a sufficient level of the tracking error signal. On the other hand, when adopting the grooves and the lands any wider than 0.6 μm, it is not possible to perform recording and reproducing at high density.

Next, the effects of possible variations in groove depth due to variations in manufacturing processes will be discussed.

Figure 4:
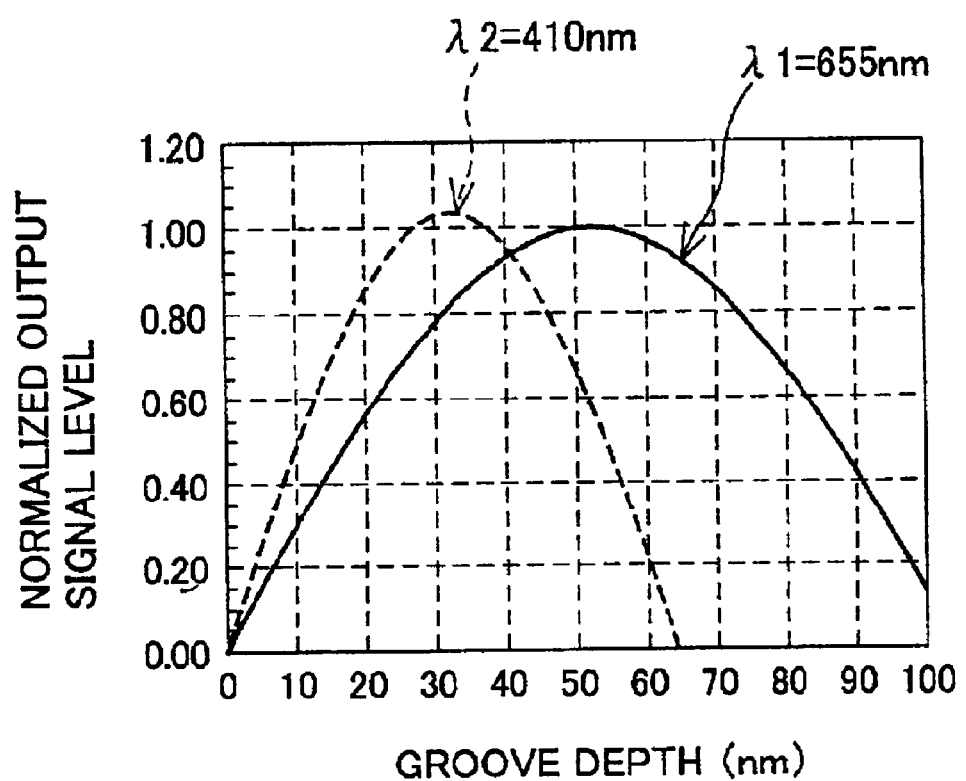
FIG. 4 is a graph showing relationships between actual groove depths and tracking error signals output from a photodetector when projecting light beams having wavelengths 655 nm and 410 nm onto the optical disk of the present invention.
Figure 6:
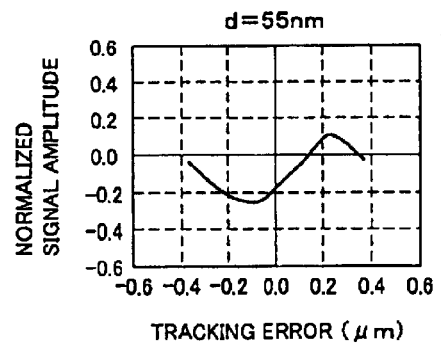
FIG. 6(a) through FIG. 6(d) are graphs which explain variations in waveform of a tracking error signal with respect to variations in groove depth when projecting a light beam having a wavelength of 410 nm onto an optical disk of the groove recording system having a track pitch of 0.74 μm.
Figure 6:
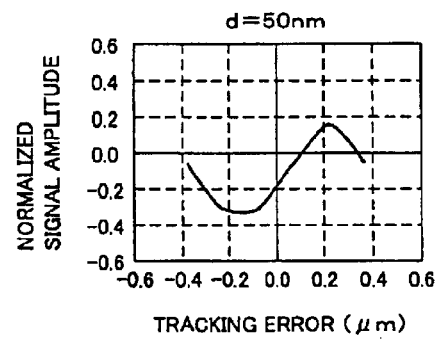
Figure 6:
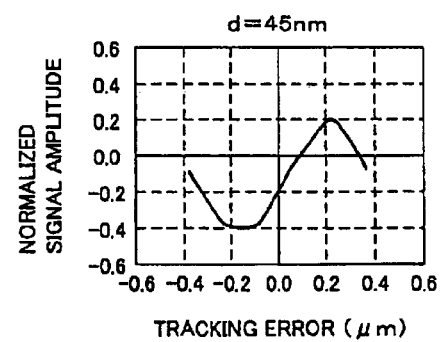
Figure 6:
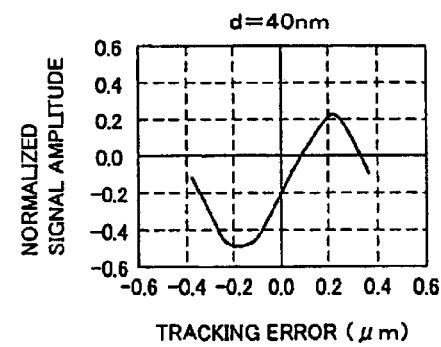
Figure 7:
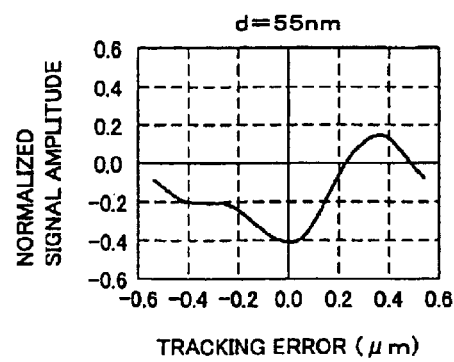
FIG. 7(a) through FIG. 7(d) are graphs which explain variations in waveform of a tracking error signal with respect to variations in groove depth when projecting a light beam having a wavelength of 410 nm onto an optical disk of the groove recording system having a track pitch of 1.07 μm.
Figure 7:
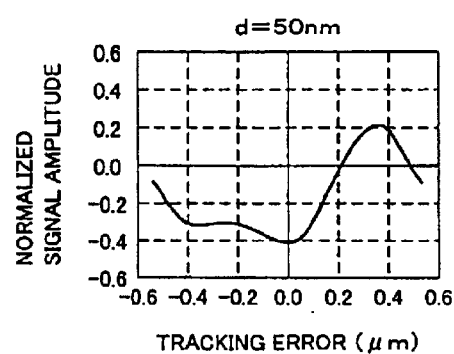
Figure 7:
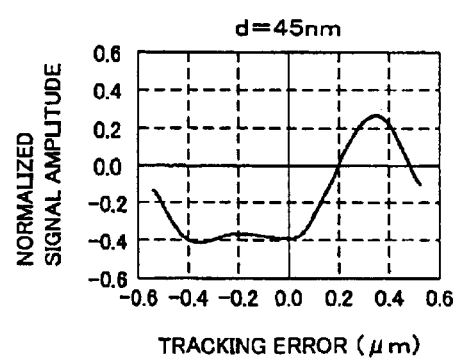
Figure 7:
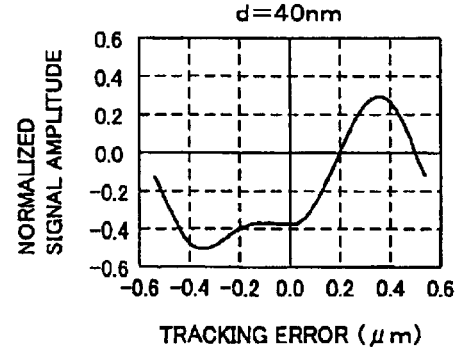
Figure 9:
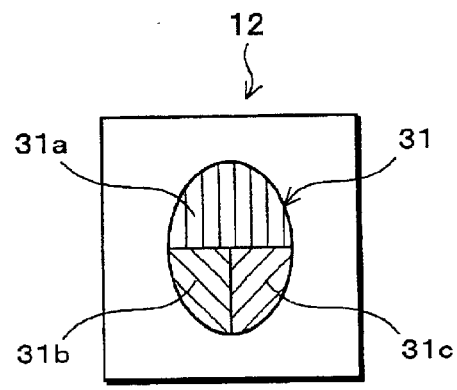
FIG. 9(a) through FIG. 9(c) are explanatory views schematically illustrating the structure of a hologram laser of the optical pickup device of FIG. 8.
Figure 9:
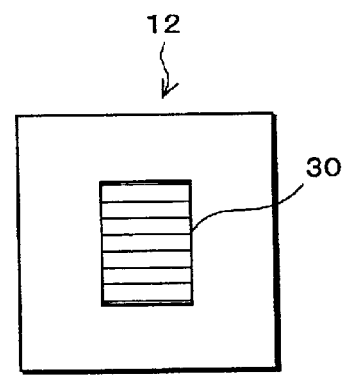
Figure 9:
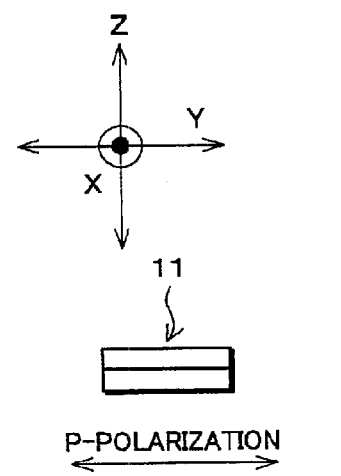
Figure 9:
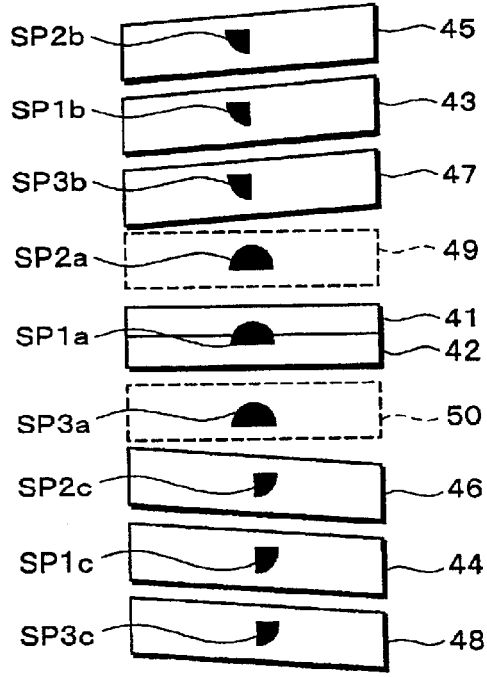

FIG. 4 is a graph in which the horizontal axis in the graphs of FIG. 3(a) and FIG. 3(b) is converted into the depth of the groove actually formed on the substrate 2. In this graph of FIG. 4, the solid line indicates the case of adopting the wavelength λ1=655 nm, and the dotted line indicates the case of adopting the wavelength λ2=410 nm. Here, the receiving light sensitivity s2/s1 is set to 1.00. It can be seen from the graph of FIG. 4 that variations in signal level with changes in groove depth are more obvious for a shorter wavelength. Therefore, the level of the tracking error signal varies with possible variations in groove depth d due to variations in manufacturing processes, which generate noises in tracking servo.

As can be seen from the result shown in FIG. 3(b), with the receiving light sensitivity ratio of s2/s1<1.00, the range for the groove depth which offers the tracking error signal of a predetermined level with respect to the wavelength λ2 would be a small range in a vicinity of λ2/n2×(8/64), i.e., λ2/n2×(1/8) in which the signal level does not change much with changes in groove depth. Therefore, as explained earlier, by setting the depth d of the grooves so as to satisfy the above defined conditions for the receiving light sensitivity ratio to s2/s1<1.00, variations in signal level with changes in groove depth at short wavelength can be suppressed.

Next, with numerical values, the specific range of depth d for the grooves actually formed on the substrate 2 is shown below.

For the substrate 2 made of polycarbonate, a refractive index n1 with respect to the wavelength λ1=655 nm is 1.585, and a refractive index n2 with respect to the wavelength λ2=410 nm is 1.62.

Therefore, for the wavelength λ1=655 nm, the range for the groove depth d which offers a tracking error signal of a predetermined level would be the range of λ1/n1×(3/64) ≦19.4 nm≦d≦λ1/n1×(13/64)=83.9 nm.

For the wavelength λ2=410 nm, with the receiving light sensitivity of s2/s1=1.00, the range of the groove depth d which offers a tracking error signal of a predetermined level would be the range of λ2/n2×(3/64)≦11.9 nm≦d≦λ2/n2× (13/64)=51.4 nm. With the receiving light sensitivity s2/s1 of 0.73, the range of the groove depth d which offers a tracking error signal of a predetermined level would be λ2/n2×(4/64)≦15.8 nm≦d≦λ2/n2×(12/64)=47.5 nm. With the receiving light sensitivity s2/s1 of 0.57, the range of the groove depth d which offers a tracking error signal of a predetermined level would be λ2/n2×(6/64)≦23.7 nm≦d≦λ2/n2×(10/64)=39.5 nm. With the receiving light sensitivity s2/s1 of 0.46, there is no groove depth d which offers a tracking error signal of a predetermined level with respect to the wavelength λ2=410 nm.

As can be seen from the above results, with the receiving light sensitivity ratio of s2/s1≧0.73, by setting the groove depth d within the range of 19.4 nm to 47.5 nm, a tracking error signal of a predetermined level can be obtained with respect to both of the wavelengths 655 nm and 410 nm.

With the receiving light sensitivity ratio of s2/s1≧0.57, by setting the groove depth d within the range of 23.7 nm to 39.5 nm, a tracking error signal of a predetermined level can be obtained with respect to both of the wavelengths 655 nm and 410 nm.

In the above experiments, the light beam having the wavelength 655 nm was adopted for the long wavelength, and the light beam having the wavelength 410 nm was adopted for the short wavelength. However, as long as the long wavelength is set within a range of from 630 nm to 680 nm, and a short wavelength is set within a range of from 390 nm to 430 nm, the recording and reproaching can be performed by either of the light beam of a long wavelength and the light beam of a short wavelength with a sufficient level of a tracking error signal by forming the groove in depth d so as to satisfy the above conditions.

In the above experiments, the grooves and lands in width of 0.535 μm were adopted; however, as long as the widths of the grooves and the lands are set within a range of from 0.5 μm to 0.6 μm, the same effects can be expected. When adopting the grooves and the lands any narrower than 0.5 μm, however, the output level of a tracking error signal at the long wavelength would be lowered, and it is therefore not possible to ensure a sufficient level of the tracking error signal. On the other hand, when adopting the grooves and the lands any wider than 0.6 μm, it is not possible to perform recording and reproducing at high density.

In view of the above results, for the optical disk of the present embodiment, it is preferable to set the grooves in depth d within a range of not less than 19.4 nm to not more than 47.5 nm (more desirably, within a range of from 23.7 nm to 39.5 nm), and in width of the groove and the land within a range of 0.5 μm to 0.6 μm. For the optical pickup device for use in reproducing information from the optical disk, it is preferable that the respective receiving light sensitivities s1 and s2 of the light receiving elements with respect to the light beams of two different wavelengths for use in recording and reproducing satisfy the condition of s2/s1≧0.57 (more desirably, s2/s1≧0.73).

Although the tracking error signal of a predetermined level can be obtained by setting the groove depth d in the above range, the waveform thereof also needs to be considered. FIG. 5(a) through FIG. 5(d) are explanatory views which explain the waveforms of the tracking error signal (push-pull signal) obtained when projecting the light beam having a wavelength of 410 nm on the land and groove of an optical disk having a track pitch of 0.535 μm through the objective lens having a numerical aperture of 0.65. These signal waveforms were obtained in the state where the spot on the photodetector was deviated from the center of the division line by 20 percent of the spot diameter due to a shift of the objective lens, a tilt of the optical disk, displacement of photodetector, etc. In this experiment, the groove depth d was varied from 55 nm to 40 nm by 5 nm, and the respective results obtained under the conditions of the groove depths of 55 nm, 50 nm, 45 nm, and 40 nm are shown in FIGS. 5(a), 5(b), 5(c) and 5(d) respectively.

Ideally, a signal of a sine wave should be obtained for the deviation in tracking. However, with the grooves in depth of not less than 50 nm, due to too large track pitch with respect to the spot diameter, the signal waveform is disturbed, and a double frequency component is generated as shown in the graphs. For the push-pull signal, a DC offset component is liable to generate, and it is possible to cancel this DC offset component by modifying the signal processing method or the format of the magneto-optical medium. However, it is not possible to change the waveform of the signal. The problem of distortion in waveform causes an error in counting tracks performed using the tracking error signal, which would result in a delay in access time.

In view of the foregoing, for the wavelength of 410 nm, it is desirable to have a groove depth of not more than 45 nm. In consideration of the required condition of the groove depth to obtain the tracking error signal of a predetermined level, with the receiving light sensitivity ratio of s2/s1≧0.73, it is desirable to set the groove depth within the range of from 19.4 nm to 45 nm. With the receiving light sensitivity ratio of s2/s1≧0.57, it is desirable to set the groove depth d within the range of from 23.7 nm to 39.5 nm, which satisfies the condition for preventing a distortion in waveform of the tracking error signal (d≦45 nm). In the case of adopting a short wavelength within the range of from 390 nm to 430 nm, almost the same effects can be expected.

Further, distortion in waveform of a tracking signal will be explained in details.

FIG. 6(a) through FIG. 6(d) are graphs which show waveforms of the tracking error signals (push-pull signals) as a result of experiment performed with respect to an optical disk of the groove recording system, having a groove width of 0.50 μm, a land width of 0.24 μm, and a track pitch of 0.74 μm with variable groove depth d. This experiment was performed by projecting a light beam having a wavelength of 410 nm through an objective lens having a numerical aperture of 0.65 to be focused on the optical disk to form a beam spot having a diameter of 0.55 μm. Also as in the case of FIG. 5(a) through FIG. 5(d), these signal waveforms were obtained in the state where the spot on the photodetector was deviated from the center of the division line by 20 percent of the spot diameter due to a shift of the objective lens, a tilt of the optical disk, displacement of photodetector, etc. In this experiment, the groove depth d was varied from 55 nm to 40 nm by 5 nm, and the respective results obtained under the conditions of the groove depths of 55 nm, 50 nm, 45 nm, and 40 nm are shown in FIGS. 6(a), 6(b), 6(c) and 6(d) respectively.

As can be seen from the results shown in FIG. 6(a) through FIG. 6(d), distortions in waveform were not observed unlike the case shown in FIG. 5(a) through FIG. 5(d) performed with respect to the optical disk of the land and groove recording system. In the land and groove recording system, as both the lands and the grooves are used as recording tracks, a track pitch in recording signal is narrow (0.535 μm) while a physical track pitch (an interval between centers of adjacent grooves) is wide (1.07 μm). Therefore, the foregoing problem of distortion in waveform is more likely to occur in the groove and land recording system as the physical track pitch is wider than the track pitch for the groove recording system (i.e., the track pitch in recording signal is identical to a physical track pitch). Namely, the distortion in waveform of the signal occurs when the beam spot diameter is too small with respect to the physical track pitch. Therefore, the foregoing problem of distortion in waveform becomes obvious in the land and groove recording system having a wide physical pitch.

For reference, FIG. 7(a) through FIG. 7(d) show waveforms of tracking error signals (push-pull signals) as a result of experiment performed with respect to an optical disk having a groove width of 0.75 μm, a land width of 0.32 μm, and a track pitch of 1.07 μm. This experiment was performed by projecting a light beam having a wavelength of 410 nm through an objective lens having a numerical aperture of 0.65 to be focused on the optical disk to form a beam spot having a diameter of 0.55 μm with variable groove depth as in the cases of FIG. 5(a) through FIG. 5(d) and FIG. 6(a) through FIG. 6(d).

Also as in the case of FIG. 5(a) through FIG. 5(d), these signal waveforms were obtained in the state where the spot on the photodetector was deviated from the center of the division line by 20 percent of the spot diameter due to a shift of the objective lens, a tilt of the optical disk, displacement of photodetector, etc. In this experiment, the groove depth d was varied from 55 nm to 40 nm by 5 nm, and the respective results obtained under the conditions of the groove depths of 55 nm, 50 nm, 45 nm, and 40 nm are shown in FIGS. 7(a), 7(b), 7(c) and 7(d) respectively.

It can be seen from the results shown in FIG. 7(a) through FIG. 7(d) that a distortion in waveform of a signal occurred even with grooves in depth of not more than 45 nm. In the case of the optical disks of the land and groove recording system having a ratio of the land width to the groove width of virtually 1 to 1, the likelihood of the distortion in waveform of the signal can be prevented by forming the grooves in depth of not more than 45 nm. However, in the case of the optical disk of the groove recording system having a ratio of the land width to the groove width of by fur different from 1 to 1, the problem of distortions in signal waveform cannot be suppressed even when setting the groove depth to be not more than 45 nm.

In practice, however, the groove recording is performed at a track pitch of not around 1.07 μm, but around 0.74 μm. It is therefore not likely that the problem of distortion in signal waveform occurs in the groove recording irrespectively of the groove depth.

According to the structure of the present embodiment, for a light beam having a wavelength of 410 nm, the beam spot diameter in the tracking direction is 0.55 μm, and thus the physical track pitch 1.07 μm is 1.95 times of the beam spot diameter, and the physical track pitch 0.74 μm is 1.35 times of the beam spot diameter. The problem of distortions in waveform is obvious when the track pitch is larger than 1.95 times of the beam spot diameter. However, it can be seen that the likelihood of the problem of distortions in waveform can be eliminated by forming the grooves in depth d of not more than 45 nm.

[Second Embodiment]

The following will explain another embodiment of the present invention with reference to Figures.

In the present embodiment, a reproducing method which can be performed with a light beam having a short wavelength even when adopting a photodetector of a low detection sensitivity s2/s1 (for example, s2/s1=0.46) will be explained.

For ease of explanation, members having the same functions as those shown in the drawings pertaining to the first embodiment above will be given the same reference symbols, and explanation thereof will be omitted here.

The optical disk 1 of the present embodiment is structured such that the reflective index r1 for the wavelength λ1 and the reflective index r2 for the wavelength λ2 satisfy the condition of r2>r1. By adopting the optical disk 1 of the foregoing structure, a lower receiving light sensitivity of the photodetector can be compensated. Specifically, the foregoing structure permits a compensation for the low receiving light sensitivity of the photodetector through the following mechanism. That is, a reflected light of a wavelength of λ2 in an amount of r2/r1 times of that of the wavelength λ1 can be obtained, and this in turn increases the amount of signals obtained by the photodetector to (s2/s1)×(r2/r1).

Here, it is desirable to set the ratio of s2/s1 and the ratio of r2/r1 anti-proportional, as a reduction in receiving light sensitivity of the photodetector can be cancelled out with an improved reflective index of the optical recording medium.

Another method of compensating for the low receiving light sensitivity will be explained in the following.

In this method, a reduction in receiving light sensitivity is compensated by setting different reproducing powers of the optical disk 1 for respective wavelengths. Specifically, by setting a different reproducing power p1 for a wavelength λ1 from the reproducing power p2 for the wavelength λ2 so as to satisfy the condition of p2>p1, a reflected light of a wavelength λ2 in an amount of p2/p1 times of that of the wavelength λ1 can be achieved. As a result, an amount of signal obtained by the photodetector can be increased to (s2/s1)×(p2/p1) times, and a reduction in receiving light sensitivity can be compensated.

It should be noted here that if the reproducing power is increased to too high, the recorded information would be erased. It is therefore preferable to adopt a recording layer having a wide margin for reproducing power, from which recorded information is difficult to be erased with an application of a light beam of the wavelength λ2.

The foregoing two methods may be used in combination. Namely, it may be arranged so as to compensate for a reduction in receiving light sensitivity by arranging the optical disk 1 so as to have different reflective indexes and reproducing powers for respective wavelengths. Specifically, by arranging such that the reflective index r1 and the reproducing power p1 at the wavelength λ1 differ from the reflective index r2 and the reproducing power p2 at a wavelength λ2 so as to satisfy the condition of r2×p2>r1×p1, an amount of reflected light having the wavelength λ2 can be increased to (r2×p2)/(r1×p1) times of that of the wavelength λ1. In this state, an amount of signals obtained by the photodetector can be increased to (s2/s1)×{(r2×p2)/(r1×p1)} times, and thus a reduction in receiving light sensitivity can be compensated.

If a reduction in receiving light sensitivity of the photodetector is completely compensated by the foregoing method, by setting the groove depth d so as to satisfy the condition of $\lambda 2/2n \times (3/64) \leq d \leq \lambda 2/n2 \times (13/64)$, the signal of a predetermined level can be ensured irrespectively of the receiving light sensitivity ratio of s2/s1 as in the case with the receiving light sensitivity ratio of s2/s1=1.00. Even if not completely, as long as a reduction in receiving light sensitivity can be compensated to some extent, the effect of obtaining a wider range for suitable groove depth can be achieved.

In the case where a reduction in receiving light sensitivity of the photodetector can be completely compensated for, by adopting the grooves in depth within a range of from 19.4 nm to 51.4 nm, tracking error signals of a predetermined level can be ensured for both of the wavelengths 655 nm and 410 nm. In consideration of the waveform of the tracking error signal, however, it is desirable to adopt the grooves in depth of not more than 45 nm for the reasons stated in the first embodiment.

[Third Embodiment]

The following will explain still another embodiment of the present invention with reference to FIG. 8 through FIGS. 10(a) and 10(b).

In the present embodiment, an optical pickup device for a magneto-optical disk is adopted as an example of the optical pickup device. However, the optical pickup device of the present invention is not limited to this, and, for example, an optical pickup device for a phase-change type medium may be adopted.

For ease of explanation, members having the same functions as those shown in the drawings pertaining to the first and second embodiments above will be given the same reference symbols, and explanation thereof will be omitted here.

FIG. 8 illustrates a schematic structure of the optical pickup device of the present embodiment. As illustrated in FIG. 8, an anisotropic light beam emitted from a semiconductor laser (light source) 11 passes through a diffraction element 12 and a polarization beam splitter 13 as P-polarized beam and is then incident on a collimating lens 14 as a scattered light beam of an elliptical cross section with its major axis in the Z-direction in the Figure. Then, this scattered light beam is converted to a parallel beam of an elliptical cross section by the collimating lens 14. The parallel beam is then incident on a shaping prism 15 with an optical axis tilted, and is diffracted by its incident surface 15a. After its ellipticity is being adjusted, the parallel beam is output from the shaping prism 15 through its output surface 15b. This parallel beam is then focused on the optical disk 1 by the objective lens 16.

The linearly polarized light beam incident on the optical disk 1 is reflected therefrom as a light beam having S-polarized components as the polarization face rotates by the magneto-optical effects. The resulting reflected light then travels back to the semiconductor layer 11 via the objective lens 16 and the shaping prism 15. This reflected light is shaped back to have an elliptical cross section of an original ellipticity by the reverse action to the incident light beam. Then, the reflected light is focused through the collimating lens 14 to be incident on the polarization beam splitter 13.

The light beam that has passed through the polarization beam splitter 13 is diffracted in the Y-direction by a diffraction grating 31 formed on a surface 12b of a diffraction element 12, and is then incident on a photodetector 18. On the other hand, the light beam reflected by the polarization beam splitter 13 is divided into P-polarization components and S-polarization components by a Wollaston prism 19 to be two light beams. These two light beams are incident on a photodetector 21 after the respective diameters are adjusted by a recessed lens 20. On the surface 12a of the diffraction element 12, formed is a diffraction grating 30 for forming three beams for use in generating a tracking error signal. Therefore, 6 light beams in total are incident on the photodetector 21. Although not shown, a finishing mirror may be provided between the shaping prism 15 and the objective lens 16 for bending the optical path. In this way, an optical pickup device of a thinner structure can be realized.

FIG. 9(a) through FIG. 9(c) are explanatory views illustrating the schematic structure of a hologram laser 22 (shown in FIG. 8) of the optical pickup device. FIG. 9(a) illustrates the diffraction grating 31 for use in generating a servo signal, formed on the surface 12b on the objective lens side of the diffraction element 12. The diffraction grating 31 is constituted by three regions 31a, 31b and 31c divided by a division line in the Y-direction and a division line in the Z-direction. The diffraction grating 31 is shaped to have an elliptical pattern from which unnecessary region is omitted in consideration of beam shaping function. However, the shape of the diffraction grating of the present invention is not limited to the elliptical shape, and, for example, a diffraction grating of an oval shape obtained by cutting off unnecessary region on both sides of the circular shape with linear boundaries may be adopted.

FIG. 9(b) illustrates the diffraction grating 30 for use in generating three beams, formed on the surface 12a on the semiconductor laser side of the diffraction element 12. This diffraction grating 30 includes linear grating patterns extending in the Y-axis direction which are aligned in the Z-direction. The diffraction grating 30 is provided for diffracting the light beam emitted from the semiconductor laser 11 in the Z-direction to generate three beams to be incident on the optical disk 1. As a result, one main beam MB and two sub beams SB1 and SB2 are incident on the optical disk 1 as illustrated in FIG. 10(a).

FIG. 9(c) is an explanatory view illustrating shapes of light receiving sections of the photodetector 18, and a positional relationship between the photodetector 18 and the semiconductor laser 11. The photodetector 18 is positioned with its center deviated in the Y-direction from the semiconductor layer 11 by around 1.2 mm. The photodetector 18 is constituted by ten light receiving sections 41 to 50.

A light reflected of the main beam MB from the optical disk 1 is incident on a diffraction grating 31, and a diffracted light from the region 31a is incident on the boundary between the light receiving section 41 and the light receiving section 42 to form a spot SP1a. Of the above reflected light, a diffracted light from the regions 31b and 31c are incident on the light receiving sections 43 and 44 to form spots SP1b and SP1c respectively.

The reflected light of the sub beam SB1 from the optical disk 1 is diffracted from the regions 31a, 31b and 31c, and then incident on the light receiving sections 49, 45 and 46 to form the spots SP2a, SP2b and SP2c respectively. The reflected light of the sub beam SB2 from the optical disk 1 is diffracted from the regions 31a, 31b and 31c, and then incident on the light receiving sections 50, 47 and 48 to form the spots SP3a, SP3b and SP3c respectively.

Assumed output signals from the light receiving sections 41 to 50 be A to J. Then, the focus error signal (FES) can be calculated through the formula of FES=B−A by the Foucault method, and a tracking error signal (TES) can be calculated through the formula of TES=(D−C)−k1×{{H−G}+k2×(F−E)} by the DPP method. Here, k1 and k2 are circuit constants for use in adjusting the gain balance. Here, the light receiving sections 49 and 50 shown by the dotted lines can be omitted as the outputs I and J are not used in the above calculations. The light receiving sections are arranged in virtually radial shape in consideration of possible shift and deformation of the diffracted light beam with changes in wavelength.

Figure 10:
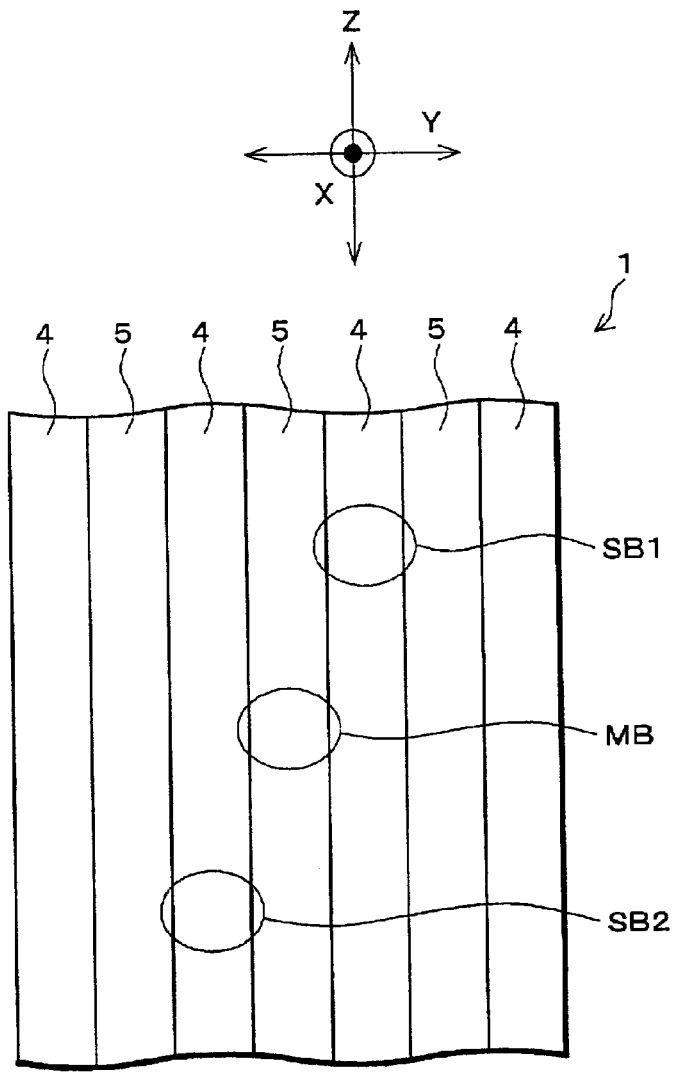
FIG. 10(a) and FIG. 10(b) are explanatory views illustrating the positional relationship between tracks and three beams on the optical disk.
Figure 10:
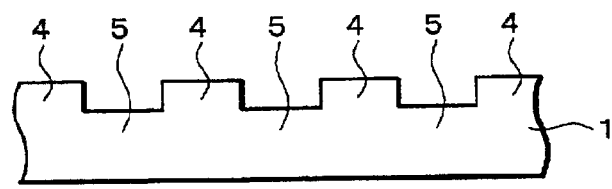

As illustrated in FIG. 10(*a*) and FIG. 10(*b*), an interval in tracking direction (Y-axis direction) between the main beam MB and the sub beams SB1 and SB2 is adjusted to be suited for the DPP method, such that when the main beam MB is positioned at the center of the groove 5, the sub beams SB1 and SB2 are positioned at centers of the lands 4 adjacent to both sides of the groove 5 respectively.

In order to ensure long life of the semiconductor laser 11, it is preferable to use it at minimum required output power. In this case, to attain improved utilization efficiency of light, the diffraction grating 30 for generating 3 beams is to be omitted, and the tracking error signal (TES) is calculated through the formula of TES=D−C by the push-pull method.

According to the foregoing structure, for example, even an optical pickup device provided with a semiconductor layer 11 for emitting a light beam having a wavelength $\lambda 2$ of 410 nm, which is actually designed for recording and reproducing with respect to the optical recording medium by a light beam having a wavelength of $\lambda 2$=410 nm, as long as a receiving light sensitivity ratio satisfies the condition of s2/s1≧0.73 (s1 is a receiving light sensitivity for the wavelength $\lambda 1$=655 nm, and s2 is a receiving light sensitivity of the wavelength $\lambda 2$=410 nm), such optical pickup device can be used for recording and reproducing on and from an optical disk for the long wavelength $\lambda 1$=655 nm having grooves in depth within the range of $\lambda 2/n2 \times (4/64) \leq d \leq \lambda 2/n2 \times (12/64)$. In the case of the optical pickup device with s2/s1≧0.57, recording and reproducing can be performed with a high precision tracking servo under stable conditions with respect to an optical disk for the wavelength $\lambda 1$ having grooves in depth d within the range of $\lambda 2/n2 \times (4/64) \leq d \leq \lambda 2/n2 \times (12/64)$.

Here, as long as the respective wavelengths $\lambda 1$ and $\lambda 2$ are set within a range of from 390 nm to 430 nm, and a range of from 630 nm to 680 nm, the particular effects as achieved from the present invention can be achieved.

Therefore, the present invention permits recording and reproducing operations to be performed with respect to the optical recording medium using light beams of two different wavelengths by means of a signal optical pickup device. Furthermore, according to the foregoing structure of the optical pickup device, as the output signal range is in common for the two wavelengths, a common signal processing circuit can be used for the light beams of two different wavelengths. It is therefore possible to manufacture the optical pickup device at still lower cost.

As described, according to the optical recording medium of the present invention, a tracking error signal of a predetermined level can be detected by either of two optical pickup devices respectively provided with light sources for emitting light beams of different wavelengths, and thus recording and reproducing with respect to such optical recording medium can be performed by either of the optical pickup devices.

It is preferable that the optical recording medium of the present invention be arranged such that:

the optical recording medium at least being reproducible by either of i) a light beam having a first wavelength $\lambda 1$ within a range of from 630 nm to 680 nm, and ii) a light beam having a second wavelength $\lambda 2$ within a range of from 390 nm to 430 nm, wherein the groove depth d satisfies the conditions of:

$\lambda 1/n1 \times (3/64) \leq d \leq \lambda 1/n1 \times (13/64)$, and $\lambda 2/n2 \times (6/64) \leq d \leq \lambda 2/n2 \times (10/64)$, wherein n1 and n2 indicate refractive indexes of the optical recording medium with respect to the first wavelength $\lambda 1$ and the second wavelength $\lambda 2$ respectively.

With the foregoing structure, even at a wide track pitch, the likelihood of the problem of distortions in waveform of a tracking error signal can be prevented.

Especially, even at a wide physical track pitch (an interval between centers of the adjacent grooves) of not less than 1.95 times of the beam spot diameter, a desirable tracking error signal without a distortion in waveform can be detected by forming the grooves in depth d in a specific range.

It is also preferable to set a reflective index r1 of the optical recording medium for the first wavelength $\lambda 1$ be smaller than a reflective index r2 for the second wavelength $\lambda 2$. In this way, a reduction in receiving light sensitivity of the optical pickup device can be compensated.

It is also preferable to set a reproducing power p1 of the optical recording medium for the first wavelength $\lambda 1$ be smaller than a reproducing power p2 for the second wavelength $\lambda 2$. In this way, a reduction in receiving light sensitivity of the optical pickup device can be compensated.

According to the structure of the optical pickup device of the present invention, by means of a single optical pickup device from which a light beam of a constant waveform is outputted, reproduction of information can be performed with stable tracking servo, with respect to the optical recording medium designed for recording and reproducing using light beams of different wavelengths.

Preferred examples for the optical recording medium and the optical pickup device of the present invention are shown below.

The optical recording medium of the present invention may be arranged so as to include lands and grooves, the optical recording medium at least being reproducible by either of i) a first optical pickup device provided with a light source for emitting a light beam having a first wavelength $\lambda 1$, and a photodetector having a receiving light sensitivity s1 with respect to the first wavelength $\lambda 1$, and ii) a second optical pickup device provided with a light source for emitting a light beam having a second wavelength $\lambda 2$ which is shorter than the first wavelength $\lambda 1$, and a photodetector having a receiving light sensitivity s2 with respect to the second wavelength $\lambda 2$, which is lower than the receiving light sensitivity s1, and the grooves are formed in such depth that both of a signal outputted from the photodetector of the first optical pickup device and a signal outputted from the photodetector of the second optical pickup device have not less than a predetermined level.

The optical recording medium of the present invention may be arranged so as to include lands and grooves, the optical recording medium at least being reproducible by either of i) a light beam having a first wavelength $\lambda 1$ within a range of from 630 nm to 680 nm, and ii) a light beam having a second wavelength $\lambda 2$ within a range of from 390 nm to 430 nm, wherein the groove depth d satisfies the conditions of:

$\lambda 1/n1 \times (3/64) \leq d \leq \lambda 1/n1 \times (13/64)$, and $\lambda 2/n2 \times (4/64) \leq d \leq \lambda 2/n2 \times (12/64)$, wherein n1 and n2 indicate refractive indexes of the optical recording medium with respect to the first wavelength $\lambda 1$ and the second wavelength $\lambda 2$ respectively.

The optical pickup device of the present invention for recording and reproducing information with respect to the foregoing optical recording medium may be arranged so as to include:

a light source for emitting the light beam of the second wavelength λ2, and a photodetector for receiving light reflected from the optical recording medium, wherein the photoreceptor has a receiving light sensitivity s2 with respect to the second wavelength λ2 satisfying the condition of:

$$s2/s1 \geq 0.73,$$

wherein s1 is a receiving light sensitivity of the photodetector with respect to the first wavelength λ1.

The optical recording medium of the present invention may be arranged so as to include lands and grooves, the optical recording medium at least being reproducible by either of i) a light beam having a first wavelength λ1 within a range of from 630 nm to 680 nm, and ii) a light beam having a second wavelength λ2 within a range of from 390 nm to 430 nm, wherein the groove depth d satisfies the conditions of:

$$\lambda1/n1 \times (3/64) \leq d \leq \lambda1/n1 \times (13/64), \text{ and}$$

$$\lambda2/n2 \times (6/64) \leq d \leq \lambda2/n2 \times (10/64),$$

wherein n1 and n2 indicate refractive indexes of the optical recording medium with respect to the first wavelength λ1 and the second wavelength λ2 respectively.

The optical pickup device of the present invention for recording and reproducing information with respect to the foregoing optical recording medium may be arranged so as to include:

a light source for emitting the light beam of the second wavelength λ2, and a photodetector for receiving light reflected from the optical recording medium, wherein the photodetector has a receiving light sensitivity s2 with respect to the second wavelength λ2 satisfying the condition of:

$$s2/s1 \geq 0.57,$$

wherein s1 is a receiving light sensitivity of the photodetector with respect to the first wavelength λ1.

The optical recording medium of the present invention may be arranged so as to include lands and grooves, the optical recording medium at least being reproducible by either of i) a light beam having a first wavelength λ1 within a range of from 630 nm to 680 nm, and ii) a light beam having a second wavelength λ2 within a range of from 390 nm to 430 nm, wherein the grooves are formed in width within a range of from 0.5 μm to 0.6 μm, and in depth d within a range of from 23.7 nm to 39.5 nm.

The optical pickup device of the present invention for recording and reproducing information with respect to the foregoing optical recording medium may be arranged so as to include:

a light source for emitting the light beam of the second wavelength λ2, and a photodetector for receiving light reflected from the optical recording medium, wherein the photodetector has a receiving light sensitivity s2 with respect to the second wavelength λ2 satisfying the condition of:

$$s2/s1 \geq 0.57,$$

wherein s1 is a receiving light sensitivity of the photodetector with respect to the first wavelength λ1.

The optical recording medium of the present invention may be arranged so as to include lands and grooves, the optical recording medium at least being reproducible by either of i) a light beam having a first wavelength λ1, and ii) a light beam having a second wavelength λ2 which is shorter than the first wavelength λ1, the groove depth d satisfies the condition of:

$$\lambda1/n1 \times (3/64) \leq d \leq \lambda1/n1 \times (13/64),$$

wherein n1 indicates a refractive index of the optical recording medium with respect to the first wavelength λ1, and a reflective index r1 of the optical recording medium with respect to the first wavelength λ1 is smaller than a reflective index r2 for the second wavelength λ2.

The optical recording medium of the present invention may be arranged so as to include lands and grooves, the optical recording medium at least being reproducible by either of i) a light beam having a first wavelength λ1, and ii) a second beam having a second wavelength λ2 which is shorter than the first wavelength λ1, the groove depth d satisfies the condition of:

$$\lambda1/n1 \times (3/64) \leq d \leq \lambda1/n1 \times (13/64),$$

wherein n1 indicates a refractive index of the optical recording medium with respect to the first wavelength λ1, and a reproducing power p1 of the optical recording medium set for the first wavelength λ1 is lower than a reproducing power p2 set for the second wavelength λ2.

The foregoing magneto-optical recording medium of the present invention may be arranged such that information can be recorded on both the lands and the grooves.

In the foregoing structure of the optical recording medium, the lands and the grooves may be formed in virtually the same width.

In the foregoing structure of the optical recording medium, it may be arranged such that an interval between centers of adjacent grooves is not less than 1.95 times of a beam spot diameter of the light beam having the second wavelength λ2.

The optical recording medium of the present invention having the foregoing structure may be a super-resolution magnetic medium.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. An optical recording medium, comprising:
   lands and grooves,
   said optical recording medium at least being reproducible by either of i) a light beam having a first wavelength λ1 set in a range of not less than 630 nm to not more than 680 nm, and ii) a light beam having a second wavelength λ2 set in a range of not less than 390 nm to not more than 430 nm, wherein said groove depth d satisfies the conditions of:

$$\lambda1/n1\times(3/64) \leq d \leq \lambda1/n1\times(13/64); \text{ and}$$

$$\lambda2/n2\times(4/64) \leq d \leq \lambda2/n2\times(12/64),$$

wherein n1 and n2 indicate refractive indexes of said optical recording medium for the first wavelength $\lambda1$ and the second wavelength $\lambda2$ respectively.

2. The optical recording medium as set forth in claim 1, wherein:
the first wavelength $\lambda1$ is set within a range of from 630 nm to 680 nm.

3. The optical recording medium as set forth in claim 1, wherein:
the second wavelength $\lambda2$ is set within a range of from 390 nm to 430 nm.

4. The optical recording medium as set forth in claim 1, wherein:
said groove depth d satisfies the conditions of:

$$\lambda1/n1\times(3/64) \leq d \leq \lambda1/n1\times(13/64); \text{ and}$$

$$\lambda2/n2\times(6/64) \leq d \leq \lambda2/n2\times(10/64).$$

5. The optical recording medium as set forth in claim 1, wherein:
information can be recorded on both said lands and grooves.

6. The optical recording medium as set forth in claim 1, wherein:
said lands and grooves are formed in virtually same width.

7. The optical recording medium as set forth in claim 6, wherein:
an interval between centers of adjacent grooves is not less than 1.95 times of a beam spot diameter of the light beam having the second wavelength $\lambda2$.

8. The optical recording medium as set forth in claim 1 being a super-resolution magnetic medium.

9. An optical pickup device for recording and reproducing information with respect to the optical recording medium of claim 1, comprising:
a light source for emitting the light beam having the second wavelength $\lambda2$, and
a photodetector for receiving light reflected from said optical recording medium,
wherein said photodetector has a receiving light sensitivity s2 with respect to the second wavelength $\lambda2$ satisfying the condition of:

$$s2/s1 \geq 0.73,$$

wherein s1 is a receiving light sensitivity of said photodetector with respect to the first wavelength $\lambda1$.

10. An optical pickup device for recording and reproducing information with respect to the optical recording medium of claim 4, comprising:
a light source for emitting the light beam having the second wavelength $\lambda2$, and
a photodetector for receiving light reflected from said optical recording medium,
wherein said photodetector has a receiving light sensitivity s2 with respect to the second wavelength $\lambda2$ satisfying the condition of:

$$s2/s1 \geq 0.57,$$

wherein s1 is a receiving light sensitivity of said photodetector with respect to the first wavelength $\lambda1$.

11. An optical recording medium, comprising:
lands and grooves,
said optical recording medium at least being reproducible by either of i) a light beam having a first wavelength $\lambda1$ set in a range of not less than 630 nm to not more than 680 nm, and ii) a light beam having a second wavelength $\lambda2$ set in a range of not less than 390 nm to not more than 430 nm,
wherein said grooves are formed in width within a range of from 0.5 $\mu$m to 0.6 $\mu$m, and in depth d within a range of from 19.4 nm to 47.5 nm.

12. The optical recording medium as set forth in claim 11, wherein:
said grooves are formed in depth d within a range of from 19.4 nm to 45 nm.

13. The optical recording medium as set forth in claim 11, wherein:
said grooves are formed in depth d within a range of from 23.7 nm to 39.5 nm.

14. The optical recording medium as set forth in claim 11, wherein:
the first wavelength $\lambda1$ is set within a range of from 630 nm to 680 nm.

15. The optical recording medium as set forth in claim 11, wherein:
the second wavelength $\lambda2$ is set within a range of from 390 nm to 430 nm.

16. The optical recording medium as set forth in claim 11, wherein:
information can be recorded on both said lands and grooves.

17. The optical recording medium as set forth in claim 11, wherein:
said lands and grooves are formed in virtually same width.

18. The optical recording medium as set forth in claim 17, wherein:
an interval between centers of adjacent grooves is not less than 1.95 times of a beam spot diameter of the light beam having the second wavelength $\lambda2$.

19. The optical recording medium as set forth in claim 11 being a super-resolution magnetic medium.

20. An optical pickup device for recording and reproducing information with respect to the optical recording medium of claim 11, comprising:
a light source for emitting the light beam having the second wavelength $\lambda2$, and
a photodetector for receiving light reflected from said optical recording medium,
wherein said photodetector has a receiving light sensitivity s2 with respect to the second wavelength $\lambda2$ satisfying the condition of:

$$s2/s1 \geq 0.73,$$

wherein s1 is a receiving light sensitivity of said photodetector with respect to the first wavelength $\lambda1$.

21. An optical pickup device for recording and reproducing information with respect to the optical recording medium of claim 13, comprising:
a light source for emitting the light beam having the second wavelength $\lambda2$, and
a photodetector for receiving light reflected from said optical recording medium, wherein said photodetector has a receiving light sensitivity s2 with respect to the second wavelength λ2 satisfying the condition of:

$$s2/s1 \geq 0.57,$$

wherein s1 is a receiving light sensitivity of said photodetector with respect to the first wavelength λ1.

22. An optical recording medium, comprising:

lands and grooves, said optical recording medium at least being reproducible by either of i) a light beam having a first wavelength λ1 set in a range of not less than 630 nm to not more than 680 nm, and ii) a light beam having a second wavelength λ2 set in a range of not less than 390 nm to not more than 430 nm, wherein said groove depth d satisfies the condition of:

$$\lambda 1/n1 \times (3/64) \leq d \leq \lambda 1/n1 \times (13/64),$$

wherein n1 indicates a refractive index of said optical recording medium for the first wavelength λ1, and a reflective index r1 of said optical recording medium with respect to the first wavelength λ1 is smaller than a reflective index r2 with respect to the second wavelength λ2.

23. The optical recording medium as set forth in claim 22, wherein:

the first wavelength λ1 is set within a range of from 630 nm to 680 nm.

24. The optical recording medium as set forth in claim 22, wherein:

the second wavelength λ2 is set within a range of from 390 nm to 430 nm.

25. The optical recording medium as set forth in claim 22, wherein:

information can be recorded on both said lands and groove.

26. The optical recording medium as set forth in claim 22, wherein:

said lands and grooves are formed in virtually same width.

27. The optical recording medium as set forth in claim 26, wherein:

an interval between centers of adjacent grooves is not less than 1.95 times of a beam spot diameter of the light beam having the second wavelength λ2.

28. The optical recording medium as set forth in claim 22 being a super-resolution magnetic medium.

* * * * *